(12) United States Patent
Takenaka

(10) Patent No.: US 9,206,788 B2
(45) Date of Patent: Dec. 8, 2015

(54) ELECTRICAL GENERATOR

(76) Inventor: Yukio Takenaka, Asahikawa (JP)

(*) Notice: Subject to any disclaimer, the term of this patent is extended or adjusted under 35 U.S.C. 154(b) by 150 days.

(21) Appl. No.: 14/239,474

(22) PCT Filed: Aug. 17, 2012

(86) PCT No.: PCT/JP2012/070910
§ 371 (c)(1),
(2), (4) Date: Feb. 18, 2014

(87) PCT Pub. No.: WO2013/027670
PCT Pub. Date: Feb. 28, 2013

(65) Prior Publication Data
US 2014/0203568 A1 Jul. 24, 2014

(30) Foreign Application Priority Data
Aug. 19, 2011 (JP) .................................. 2011-179537

(51) Int. Cl.
*F03G 3/00* (2006.01)
*F03G 7/10* (2006.01)
*H02K 7/18* (2006.01)

(52) U.S. Cl.
CPC .. *F03G 3/00* (2013.01); *F03G 7/10* (2013.01); *H02K 7/1846* (2013.01); *Y10S 74/09* (2013.01)

(58) Field of Classification Search
CPC ...................................... F03G 7/10; F03G 3/06
USPC ....... 185/27, 29, 32, 33; 290/1 R, 53; 472/30, 472/44, 45; 482/54; 310/36, 37; 74/61, 74/572.2, 574.2, 574.3; 60/396, 698
See application file for complete search history.

(56) References Cited

U.S. PATENT DOCUMENTS

| | | | |
|---|---|---|---|
| 5,387,818 A * | 2/1995 | Leibowitz | 290/1 R |
| 5,667,038 A * | 9/1997 | Tarnopolsky | 185/27 |
| 5,921,133 A * | 7/1999 | Tarnopolsky | 74/64 |
| 6,363,804 B1 * | 4/2002 | Tarnopolsky | 74/64 |
| 2013/0257060 A1 * | 10/2013 | Horng | 290/1 R |

FOREIGN PATENT DOCUMENTS

| | | |
|---|---|---|
| JP | 2001-248536 A | 9/2001 |
| JP | 2005-039949 A | 2/2005 |
| JP | 2006-014571 A | 1/2006 |

* cited by examiner

*Primary Examiner* — Tulsidas C Patel
*Assistant Examiner* — Sean Gugger
(74) *Attorney, Agent, or Firm* — Muncy, Geissler, Olds & Lowe, P.C.

(57) ABSTRACT

[Problem] To provide a electrical generator capable of obtaining a more stable power generation by preventing a spindle body from tilting and swinging to the right and left due to centrifugal force acting on the spindle body.
[Solution] A electrical generator (1) has: a rotating body (2) that rotates in a vertical plane about a rotating shaft (21) supported substantially horizontally; a rotation drive means (3) for rotating the rotating body (2); a plurality of power generation motors (4) disposed at equal intervals on the same circular orbit centered on the rotating shaft (21) of the rotating body (2); and a spindle body (5) hung at the motor rotating shaft (42) of each of the power generation motors (4). The spindle body (5) weighs such that when the rotating body (2) is rotated at a predetermined rotational speed, the gravity thereof is larger than the centrifugal force acting on the spindle body (5), and the center of gravity thereof is set close to the motor rotating shaft (42).

4 Claims, 6 Drawing Sheets

ELECTRICAL GENERATOR

TECHNICAL FIELD

The present invention relates to a electrical generator which generates power by converting gravitational energy into torques of power generation motors.

BACKGROUND ART

Conventionally, various power generation devices which use gravitational energy are proposed. A typical power generation device is a hydraulic power generation device which generates power by rotating a turbine using water discharged from a dam or flowing water of a river. However, such a hydraulic power generation device requires large-scale construction to build a dam and has a problem that building and manufacturing costs are high. Further, the amount of water in a dam or a river changes depending on the weather or the season, and therefore there is a problem that it is difficult to stably supply power when a water shortage occurs.

Hence, the inventors of this application proposes as a new power generation device which uses gravitational energy a ring power generation system which has a rotation driving motor, a ring body which is coupled to this motor to be rotated, a plurality of power generation motors which are arranged at equal intervals on this ring body and weight bodies which are hung from the motor rotary shafts of these power generation motors in Japanese Patent Application Laid-Open No. 2005-39949 (Patent Literature 1). According to this Patent Literature 1, the power generation motor rotates with the ring body and the motor rotary shaft keep the same posture by the hung weight body, so that the motor body and the motor rotary shaft of the power generation motor relatively rotate and it is possible to generate power.

That is, the ring power generation system is a electrical generator which has never been heard of and which can rotate the power generation motors using gravitational energy which works on the weight bodies and convert the rotation into electric energy.

Further, the ring power generation system provides an advantage that manufacturing cost is low since commercial motors can be used for the rotation driving motor and the power generation motors. Furthermore, the rotation driving motor causes rotation, so that fluctuation is not caused by the weather or the season.

Still further, a plurality of power generation motors are arranged at equal intervals on a ring body, so that weights of the opposing power generation motors cancel each other about the rotary shaft of the ring body and energy which resists the gravitational force is not required. Consequently, it is possible to provide advantages that energy required to rotate the ring body and the like is small and running cost is low.

CITATION LIST

Patent Literature

Patent Literature 1: Japanese Patent Laid-Open No. 2005-39949

SUMMARY OF INVENTION

Technical Problem

However, in the invention disclosed in Patent Literature 1, the weight bodies are inclined or are shaken and moved when the weight bodies are influenced by a centrifugal force. When the weight bodies are inclined, a balance between the weights of the ring body is lost, and the loss of the balance causes vibration, noise, destruction or the like. Further, when the weight bodies are shaken, relative rotary speeds of the motor bodies and the motor rotary shafts change, and therefore the amount of generated power fluctuates even for a short period of time and stability is lost. Furthermore, when the rotary speeds of the rotary bodies becomes fast, the centrifugal force applied to the weight bodies is larger than the gravitational force applied to weight body members, and the weight bodies spin and turn over.

Hence, there has been a room for improvement to stabilize power generation of the ring power generation system.

The present invention is made to solve these problems, and an object of the present invention is to provide a electrical generator which can more stably generate power by preventing weight bodies from being inclined or shaken to the left and the right by a centrifugal force applied to the weight bodies.

Solution to Problem

A electrical generator according to the present invention has: a rotary body which rotates in a vertical plane about a rotary shaft which is nearly horizontally supported; a rotation driving unit which rotates the rotary body; a plurality of power generation motors which are arranged at an equal interval on a trajectory on a same circumference about the rotary shaft of the rotary body; and a weight body which is hung from a motor rotary shaft of the power generation motors, and the weight body has such a weight that a gravitational force to be applied to the weight body is greater than a centrifugal force to be applied to the weight body when a gravitational force rotates the rotary body at a predetermined rotary speed, and a gravity center of the weight body is provided near the motor rotary shaft.

Further, according to one aspect of the present invention, the weight body may have: an arm of a nearly semicircular shape which has a linear portion and an arc portion; and a weight which is provided at an arbitrary position along the arc portion, and may be fixed at an arbitrary position along the linear portion and to the motor rotary shaft.

Furthermore, according to one aspect of the present invention, the position to fix the motor rotary shaft to the linear portion may be positioned on a right side of a center of the linear portion when the rotary body rotates clockwise, and may be positioned on a left side when the rotary body rotates counterclockwise; and a position to install the weight on the arc portion is positioned on a right side of a center of the arc portion when the rotary body rotates clockwise, and is positioned on a left side when the rotary body rotates counterclockwise.

Still further, according to one aspect of the present invention, the weight body may be provided with an air resistance receiving portion which receives resistance of air produced by rotation of the rotary body; the air resistance receiving portion may be provided on a left side when the rotary body rotates clockwise, and may be provided on a right side when the rotary body rotates counterclockwise.

Moreover, according to one aspect of the present invention, a shift gear which rotates the motor rotary shaft at a number of rotations equal to or more than a number of rotations at which the rotary body is rotated may be provided between the weight body and the motor rotary shaft.

Advantageous Effects of Invention

The present invention can more stably generate power by preventing weight bodies from being inclined or shaken to the left and the right by a centrifugal force applied to the weight bodies.

DESCRIPTION OF EMBODIMENT

Figure 1:
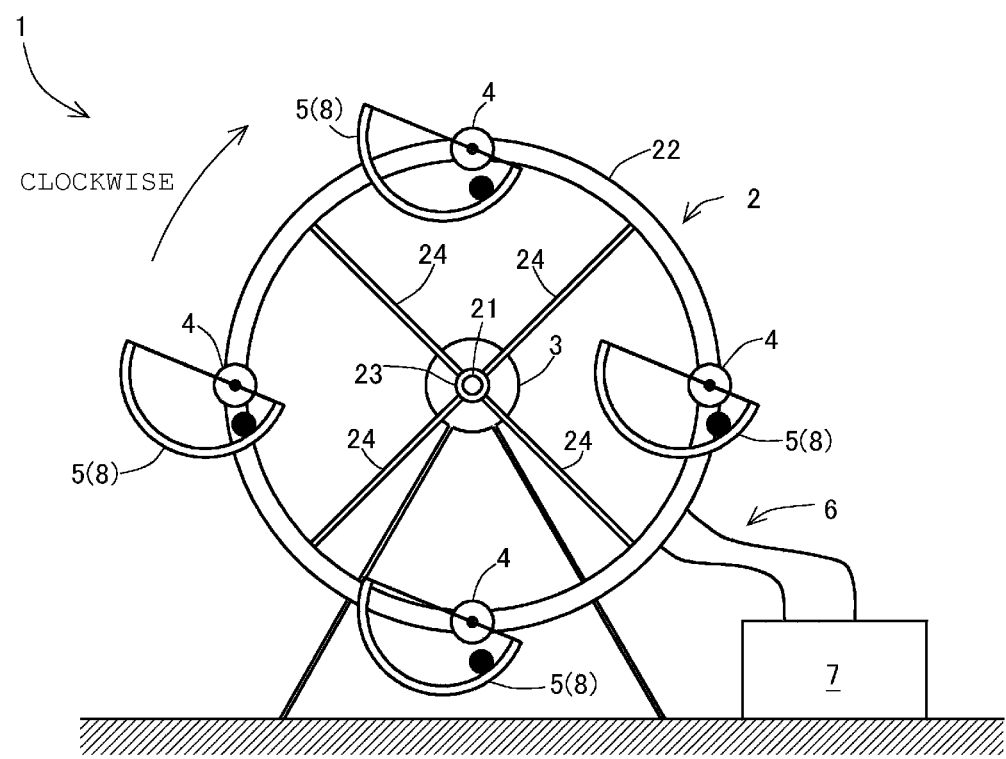
FIG. 1 is a front view illustrating a electrical generator according to one embodiment of the present invention.
Figure 2:
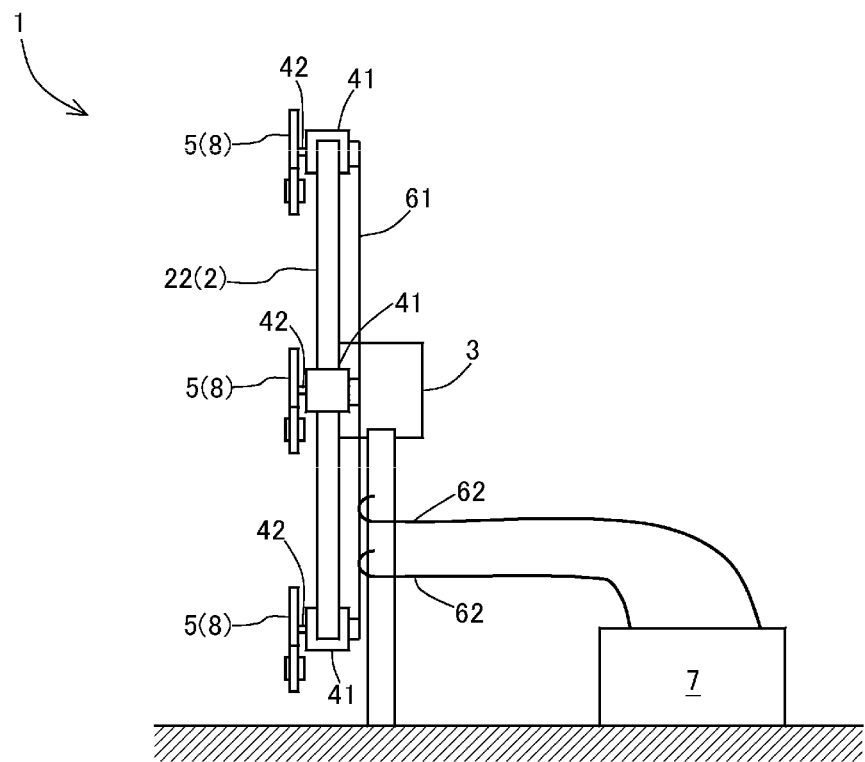
FIG. 2 is a side view illustrating the electrical generator according to the present embodiment.

Hereinafter, a electrical generator according to one embodiment of the present invention will be described using the figures. FIGS. 1 and 2 are a front view and a side view of a electrical generator 1 according to the present embodiment.

As illustrated in FIGS. 1 and 2, the electrical generator 1 according to the present embodiment has a rotary body 2, a rotation driving unit 3 which drives this rotary body 2, a plurality of power generation motors 4 which are arranged on the rotary body 2, weight bodies 5 which are hung from motor rotary shafts 42 of these power generation motors 4, a collector unit 6 which collects electricity generated by the power generation motors 4 and a charging battery 7 which charges the electricity collected by this collector unit 6.

The rotary body 2 has a rotary shaft 21 which is nearly horizontally supported, and rotates in a vertical place about this rotary shaft 21. As illustrated in FIG. 1, the rotary body 2 according to the present embodiment has a rim portion 22 of a circular ring shape, a hub portion 23 which has the rotary shaft 21 and spoke portions 24 which connect the rim portion 22 and the hub portion 23.

In addition, although the rotary body 2 is not limited to the one illustrated in FIG. 1 and produces a difference in power generation efficiency, the rotary body 2 may be shaped into, for example, a disk shape or a columnar shape. Further, the rotary body preferably has a shape which can keep such a balance that weights at opposing positions about the rotary shaft cancel each other, and may be formed in a regular polygonal shape in addition to a circular shape.

The rotation driving unit 3 rotates the rotary body 2 at a predetermined rotary speed. In the present embodiment, a commercial electric motor is used for the rotation driving unit 3, and the rotary shaft of this electric motor is coupled to the rotary shaft 21 of the rotary body 2.

In addition, the rotation driving unit 3 is not limited to the electric motor and may be adequately selected from an internal combustion engine such as a gasoline engine, a windmill or a waterwheel. Further, a shift gear or the like which adjusts a rotary speed may be provided between the rotary shaft of the rotation driving unit 3 and the rotary shaft 21 of the rotary body 2.

The power generation motor 4 may adopt a commercial electric motor, and has a motor body 41 which has a permanent magnet and a motor rotary shaft 42 which has a coil. This power generation motor 4 generates power when the motor body 41 and the motor rotary shaft 42 relatively rotate and a current flows in the coil of the motor rotary shaft 42.

In the rotary body 2, a plurality of power generation motors 4 are arranged at equal intervals on a trajectory of the same circumference about the rotary shaft 21 of the rotary body 2 such that the weights of the power generation motors 4 cancel each other. In the present embodiment, as illustrated in FIG. 1, the four power generation motors 4 are fixed to the rim portion 22 of the rotary body 2 at equal intervals. In addition, although the number of the power generation motors 4 is not limited in particular from a view point of power generation, the power generation motors 4 whose number is even are preferably arranged with a good balance to increase the power generation efficiency taking into account the balance between the weights of the power generation motors 4 at opposing positions and the centrifugal force.

The weight body 5 is hung from the motor rotary shaft 42 of each power generation motor 4. This weight body 5 keeps a hung posture, and relatively rotates the motor body 41 and the motor rotary shaft 42.

Further, a weight of the weight body 5 is set by calculating in advance the centrifugal force to be applied to the weight body and making the gravitational force of the weight body 5 larger than this centrifugal force to prevent the weight body from being inclined or turned over by the centrifugal force. Furthermore, the gravity center of the weight body 5 is provided closer to the motor rotary shaft 42 of the power generation motor 4 as much as possible.

Figure 3:
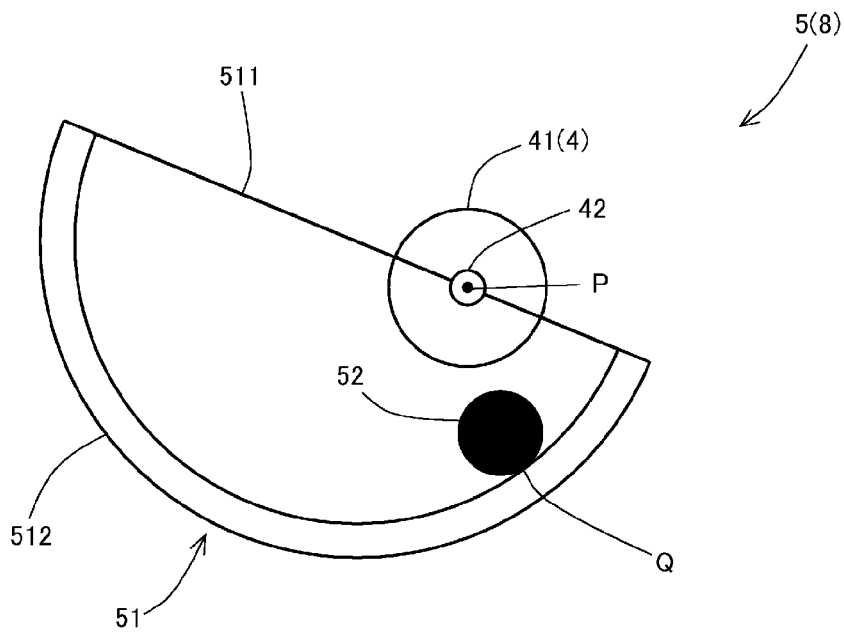
FIG. 3 is an enlarged front view illustrating a weight body when a rotary body rotates clockwise according to the present embodiment.

As illustrated in FIGS. 1 and 3, the weight body 5 according to the present embodiment has an arm 51 of a nearly semicircular shape and a weight 52 which is provided to this arm 51.

As illustrated in FIG. 3, the arm 51 is used to hang the weight 52 from the motor rotary shaft 42, and is formed in a nearly semicircular shape which has a linear portion 511 and an arc portion 512 in the present embodiment. The linear portion 511 is a portion which is fixed to the motor rotary shaft 42 of the power generation motor 4, and the arc portion 512 is a portion to which the weight 52 is fixed. In the present embodiment, the weight 52 is provided closer to the motor rotary shaft 42 of the power generation motor 4 on an inner side of the arc portion 512 as much as possible.

Further, the arm 51 according to the present embodiment functions as an air resistance receiving portion 8. This air resistance receiving portion 8 receives resistance of air produced by rotation of the rotary body 2 to apply to the weight body 5 a torque which is opposite to a direction in which the weight body 5 is inclined by the centrifugal force and prevent the weight body 5 from inclining. In the present embodiment, a position P to fix the linear portion 511 of the arm 51 and the motor rotary shaft 42 of the power generation motor 4 is placed to one side with respect to the center of the linear portion 511 to produce a difference between air resistances to be applied to the left and the right of the fixing position P when the rotary body 2 rotates and causes the arm 51 to function as the air resistance receiving portion 8.

Figure 4:
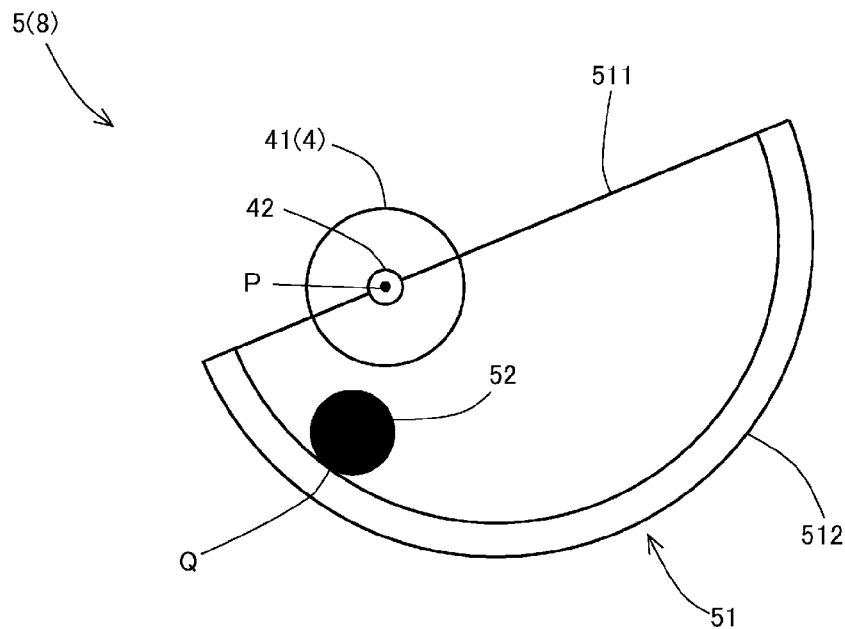
FIG. 4 is an enlarged front view illustrating the weight body when the rotary body rotates counterclockwise.

More specifically, when the rotary body 2 rotates clockwise, the position P to fix the motor rotary shaft 42 to the linear portion 511 is positioned on the right side of the center of the linear portion 511 as illustrated in FIG. 3. Meanwhile, when the rotary body 2 rotates counterclockwise, the position P to fix the motor rotary shaft 42 to the linear portion 511 is positioned on the left side of the center of the linear portion 511 as illustrated in FIG. 4.

Figure 5:
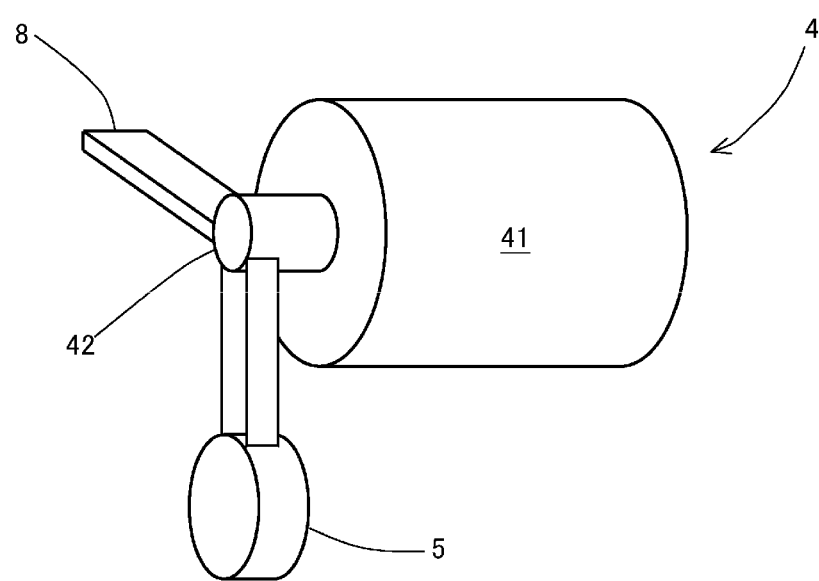
FIG. 5 is a perspective view illustrating an air resistance receiving portion according to another embodiment.

In addition, the air resistance receiving portion 8 is not limited to the arm 51 as in the present embodiment, and may be formed as, for example, a plate which receives air resistance as illustrated in FIG. 5.

The weight 52 is provided along the arc portion 512 of the arm 51. Further, in the present embodiment, a position Q to fix the weight 52 is placed to one side with respect to the center of the arc portion 512 to provide the gravity center of the weight body 5 near the motor rotary shaft 42.

More specifically, when the rotary body 2 rotates clockwise, the position Q to fix the weight 52 to the arc portion 512 is positioned on the right side of the center of the arc portion 512 to provide the gravity center of the weight body 5 near the motor rotary shaft 42 as illustrated in FIG. 3. Further, when the rotary body 2 rotates counterclockwise, the position Q to fix the weight 52 to the arc portion 512 is positioned on the left side of the center of the arc portion 512 to provide the gravity center of the weight body 5 near the motor rotary shaft 42 as illustrated in FIG. 4.

Furthermore, although not illustrated, in the present embodiment, a shift gear which rotates the motor rotary shaft 42 at the number of rotations equal to or more than the number of rotations at which the rotary body 2 rotates is provided between the weight body 5 and the motor rotary shaft 42 to efficiently rotate the motor rotary shaft 42.

The collector unit 6 collects power generated by the power generation motors 4, and has a rail 61 which is coupled to electrodes to the power generation motors and collector terminals 62 which contact the rail 61 to collect power in the present embodiment.

The charging battery 7 is a commercial charging battery. Further, the charging battery 7 is connected to the collector terminals 62 of the collector unit 6 to be energized. In addition, the type of the charging battery 7 is not limited in particular, and can be adequately selected from a lead rechargeable battery, a nickel rechargeable battery or the like.

Next, a function of each configuration of the electrical generator 1 according to the present embodiment will be described.

First, power is supplied to the electric motor of the rotation driving unit 3 to rotate the rotary body 2. The rotary shaft 21 at the hub portion 23 of the rotary body 2 receives the torque of the rotation driving unit 3 and rotates, and this torque is transmitted to the rim portion 22 through the spoke portions 24 and is transmitted to a plurality of power generation motors 4 arranged at the rim portion 22. In the present embodiment, the rotary body 2 rotates clockwise as illustrated in FIG. 1.

In this case, the rotary body 2 and the power generation motors 4 are arranged with such a balance that the weights cancel each other about the rotary shaft 21 of the rotary body 2, so that lifting energy which works in a direction opposite to the gravitational force is not required when the rotary body 2 rotates.

Further, the inertial force starts rotation of the rotary body 2 when the rotary speed reaches a predetermined speed, and therefore energy required to rotate the rotary body 2 is only loss of energy caused by a friction force at the rotary shaft 21 or the air resistance of each component.

The weight body 5 is pulled downward by the gravitational force applied to this weight body 5, and therefore tends to keep a state where the weight body 5 hangs from the motor rotary shaft 42. The power generation motors 4 rotate together with the rotary body 2 in a state where the weight bodies 5 are hung, so that the motor bodies 41 and the motor rotary shafts 42 relatively rotate. When the motor body 41 and the motor rotary shaft 42 relatively rotate, an electromotive force is produced in the coil of the motor rotary shaft 42 and the power generation motor 4 generates power.

The weight body 5 according to the present embodiment is formed to have such a weight that the gravitational force to be applied to the weight body 5 is greater than the centrifugal force to be applied to the weight body 5 when the rotary body 2 is rotated at a predetermined rotary speed.

Figure 6:
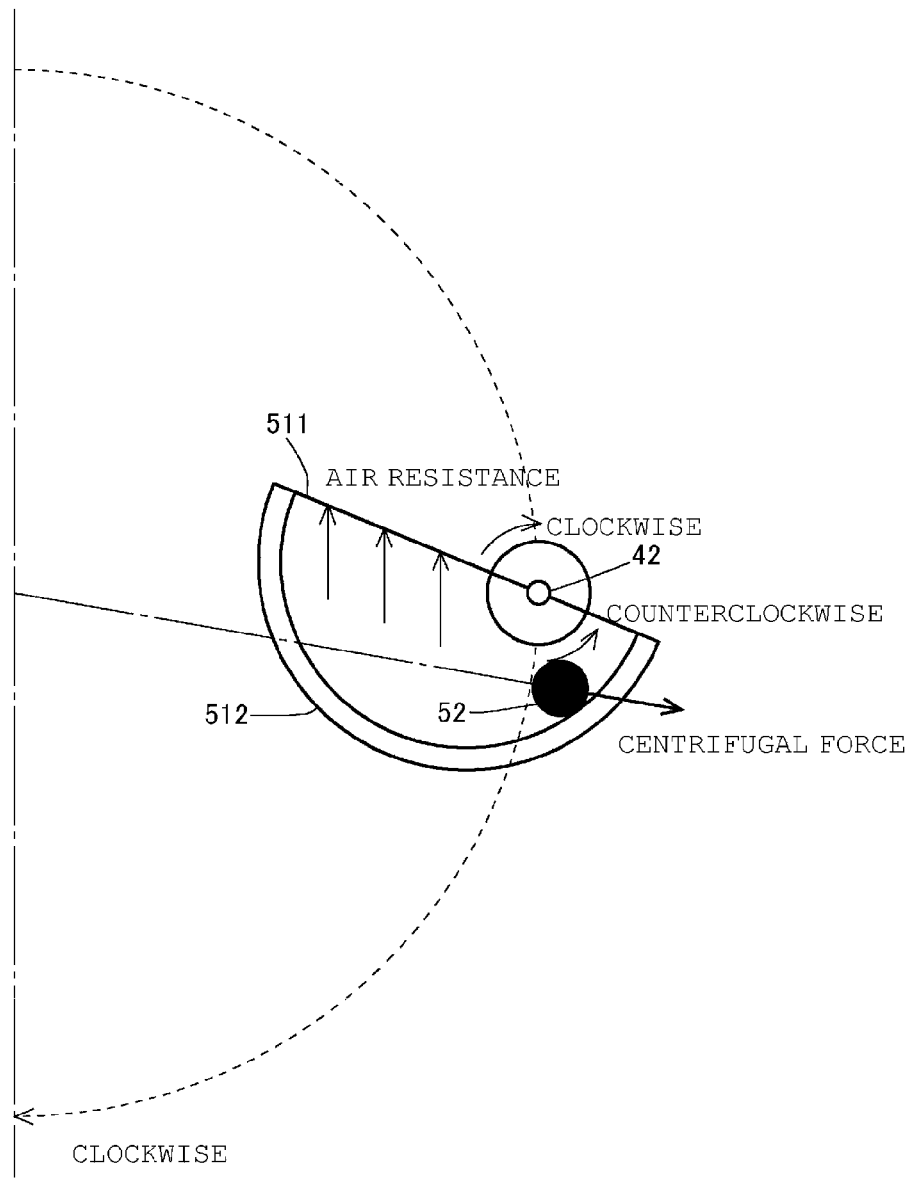
FIG. 6 is an enlarged front view illustrating the centrifugal force and air resistance applied to the weight body when the rotary body rotates counterclockwise downward from above.

Further, in the present embodiment, the arm 51 of the weight body 5 also functions as the air resistance receiving portion 8. As illustrated in FIG. 6, when the rotary body 2 rotates clockwise and then the power generation motor 4 and the weight body 5 rotate downward from above, the weight body 5 is spun counterclockwise about the motor rotary shaft 42 by the centrifugal force. Meanwhile, the air resistance received by the arm 51 according to the present embodiment is significant on the left side of the arm 51. Hence, a force to spin clockwise about the motor rotary shaft 42 works on the weight body 5.

Hence, the torque produced by the centrifugal force and the torque produced by the air resistance cancel each other at the weight body 5, so that the weight body 5 is prevented from spinning and keeps the posture.

Figure 7:
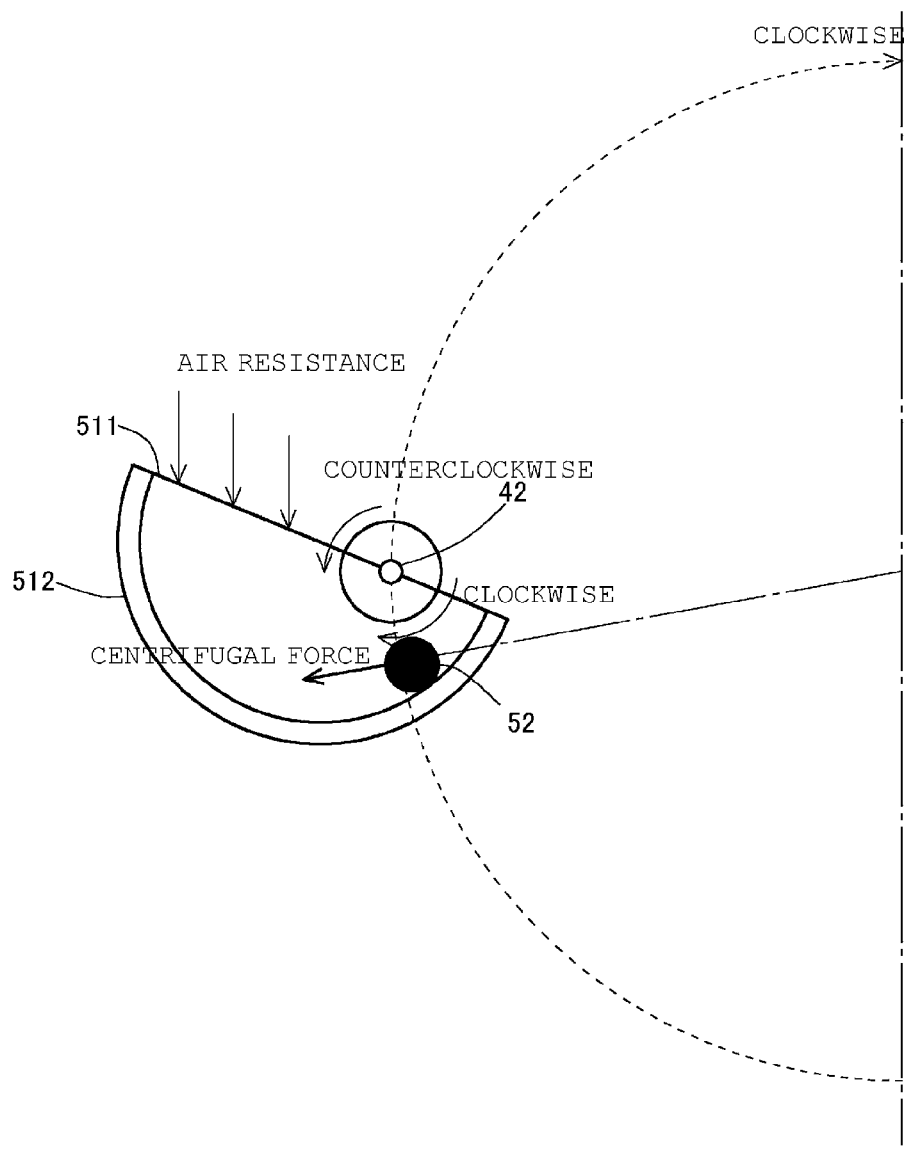
FIG. 7 is an enlarged front view illustrating the centrifugal force and the air resistance applied to the weight body when the rotary body rotates counterclockwise upward from below.

Further, when the power generation motor 4 and the weight body 5 rotate upward from below, the weight body 5 tends to be spun clockwise about the motor rotary shaft 42 by the centrifugal force likewise as illustrated in FIG. 7. Meanwhile, the air resistance received by the arm 51 is significant on the left side of the arm 51, so that a force to spin counterclockwise about the motor rotary shaft 42 works on the weight body 5.

Consequently, even when the power generation motor 4 and the weight body 5 rotate upward from below, the torque produced by the centrifugal force and the torque produced by the air resistance cancel each other at the weight body 5, so that the weight body 5 is prevented from spinning and keeps the posture.

Further, the weight 52 is provided on the right side along the arc portion 512 of the arm 51 to provide the gravity center of the weight body 5 near the motor rotary shaft 42. Consequently, even if the weight bodies 5 are inclined, it is possible to minimize loss of balance between the weights about the rotary shaft 21 of the rotary body 2.

In addition, each power generation motor 4 according to the present embodiment relatively rotates with respect to each motor rotary shaft 42 at the number of rotations increased by the shift gear every time the rotary body 2 rotates once and, consequently, can efficiently generate power.

The collector unit 6 collects power generated by each power generation motor 4. In addition, the collector unit 6 according to the present embodiment is formed with the rail 61 and the collector terminal 62, and consequently is not twisted.

The power collected by the collector unit 6 is accumulated in the charging battery 7. By connecting electric equipment to the charging battery 7 in which the power is accumulated, it is possible to actuate desired electric equipment.

According to the above embodiment, it is possible to provide the following effects.

1. It is possible to stably generate power by using the gravitational force by preventing the weight bodies 5 from being shaken to the left and the right by the centrifugal force.

2. It is possible to prevent the weight bodies 5 from spinning and turning over while the rotary body 2 is rotating.

3. It is possible to effectively suppress vibration and noise produced when the rotary body rotates.

In addition, the electrical generator according to the present invention is not limited to the above embodiment, and can be adequately changed.

For example, the electrical generator 1 according to the present invention may directly feed power to an electric appliance using a transformer without using the charging battery 7. Further, the electrical generator 1 may feed power to a power grid.

REFERENCE SIGNS LIST

1 electrical generator
2 rotary body
3 rotary body driving unit
4 power generation motor
5 weight body
6 collector unit
7 charging battery
8 air resistance receiving portion
21 rotary shaft
22 rim portion
23 hub portion
24 spoke portion
41 motor body
42 motor rotary shaft
51 arm
52 weight
61 rail
62 collector terminal
511 linear portion
512 arc portion
P installation position of motor rotary shaft
Q installation position of weight

The invention claimed is:

1. An electrical generator comprising:
   a rotary body which rotates in a vertical plane about a rotary shaft which is nearly horizontally supported;
   a rotation driving unit which rotates the rotary body powered by an external power source;
   a plurality of power generation motors which are arranged at an equal interval on a trajectory on a same circumference about the rotary shaft of the rotary body; and
   a weight body which is hung from a motor rotary shaft of the power generation motors, wherein:
   the weight body comprises: an arm of a nearly semicircular shape which comprises a linear portion and an arc portion; and a weight which is provided at an arbitrary position along the arc portion;
   the motor rotary shaft is positioned on a right side of a center of the linear portion when the rotary body rotates clockwise, and is positioned on a left side when the rotary body rotates counterclockwise; and
   the weight is positioned on a right side of a center of the arc portion when the rotary body rotates clockwise, and is positioned on a left side when the rotary body rotates counterclockwise.

2. The electrical generator according to claim 1, wherein:
   the weight body is provided with an air resistance receiving portion which receives resistance of air produced by rotation of the rotary body; and
   the air resistance receiving portion is provided on a left side when the rotary body rotates clockwise, and is provided on a right side when the rotary body rotates counterclockwise.

3. The electrical generator according to claim 1, wherein a shift gear which rotates the motor rotary shaft at a number of rotations equal to or more than a number of rotations at which the rotary body is rotated is provided between the weight body and the motor rotary shaft.

4. The electrical generator according to claim 2, wherein a shift gear which rotates the motor rotary shaft at a number of rotations equal to or more than a number of rotations at which the rotary body is rotated is provided between the weight body and the motor rotary shaft.

* * * * *